United States Patent [19]
DePalma et al.

[11] Patent Number: 6,010,253
[45] Date of Patent: Jan. 4, 2000

[54] FILM PACKET

[75] Inventors: Vito A. DePalma, Rochester; Christine J. T. Landry-Coltrain, Fairport, both of N.Y.

[73] Assignee: Eastman Kodak Company, Rochester, N.Y.

[21] Appl. No.: 09/140,885

[22] Filed: Aug. 27, 1998

[51] Int. Cl.$^7$ ..................................................... G03B 17/26
[52] U.S. Cl. ............................................................ 396/517
[58] Field of Search .................................... 396/517, 518, 396/526, 364, 366

[56] References Cited

U.S. PATENT DOCUMENTS

| | | | |
|---|---|---|---|
| 4,994,835 | 2/1991 | Loose et al. | 396/517 |
| 4,994,836 | 2/1991 | Loose et al. | 396/517 |

*Primary Examiner*—D. Rutledge
*Attorney, Agent, or Firm*—Carl F. Ruoff

[57] ABSTRACT

The present invention is a film packet which includes a photosensitive film sheet having leading and trailing ends. A light-shielding envelope removably encloses the carrier sheet and the film sheet. The envelope has first and second exterior surfaces overlying the first and second outward-facing surfaces respectively and has first and second interior surfaces facing the first and second outward surfaces respectively. The envelope includes longitudinally extending leading and trailing end portions overlying the leading and trailing end sections respectively. The leading end portion is sealed closed, and the trailing end portion is closable by cooperative engagement with the light-locking element. The leading end portion includes first and second graspable zones. The first graspable zone overlies the tab so that, when grasped, the first zone is pressed against the tab and the second graspable zone does not overlie the tab so that, when grasped, the second zone is not pressed thereagainst. The trailing end portion has a transversely disposed movement-limiting element secured to said first exterior surface thereof wherein the envelope is removable from the carrier sheet and film sheet by longitudinal relative movement therebetween in a direction separating the trailing end portion from the light-locking element. The first and second interior surfaces of the envelope have a coating thereon comprising a first polymer and a second polymer at a first polymer to second polymer weight ratio of from 1:1 to 10:1.

7 Claims, 4 Drawing Sheets

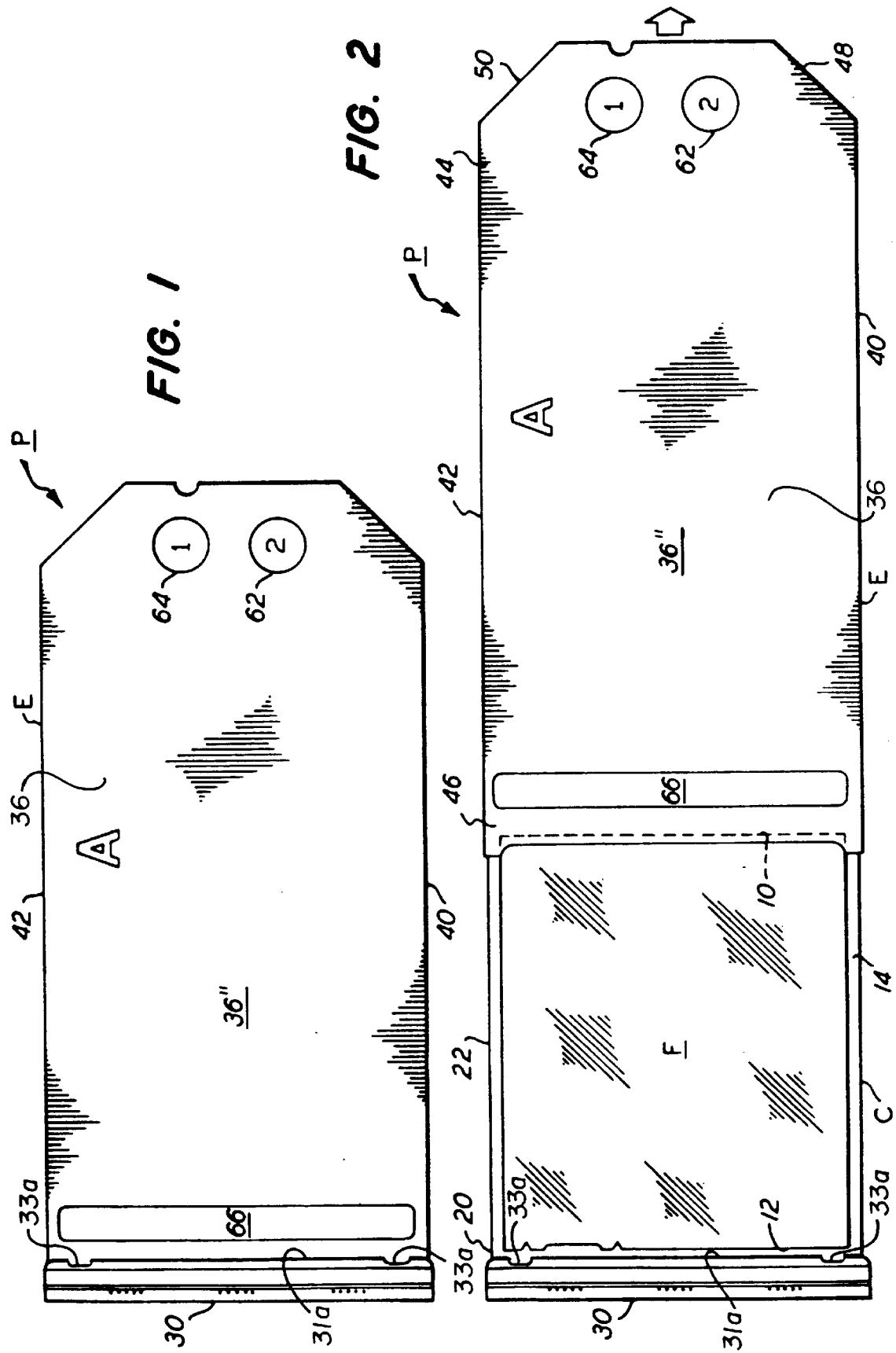

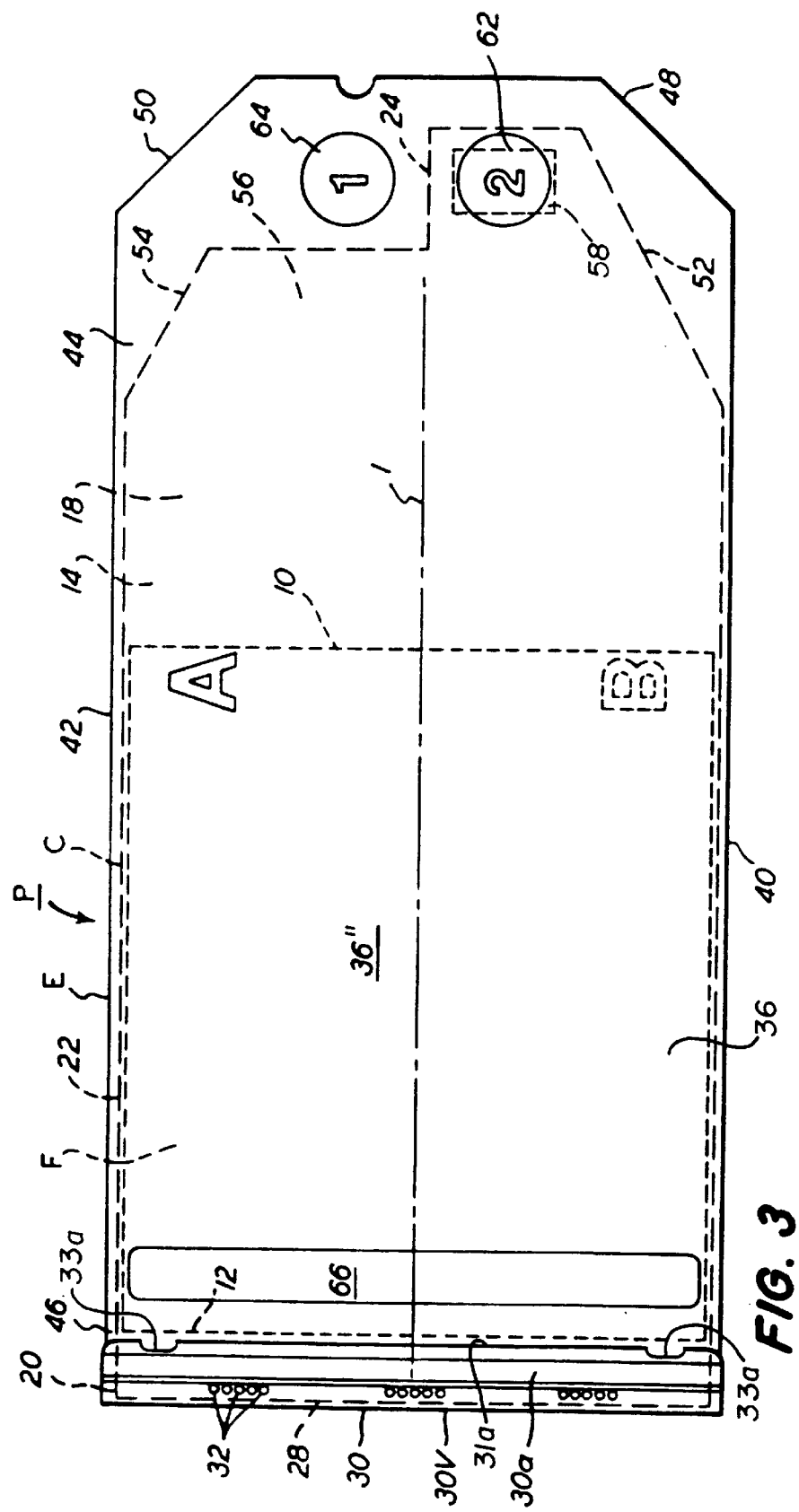
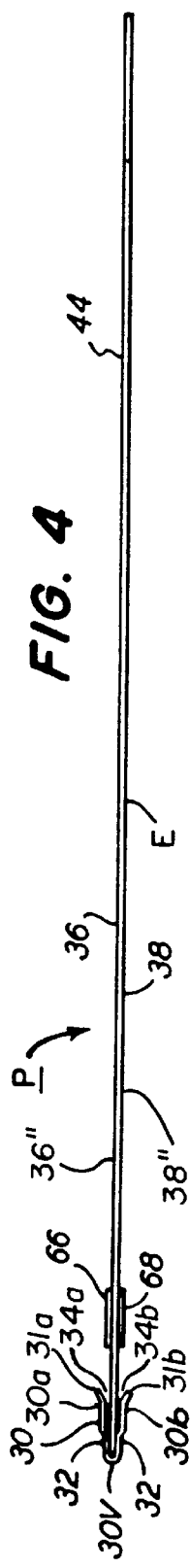
FIG. 3
FIG. 4

FILM PACKET

FIELD OF THE INVENTION

The present invention relates generally to film holders, and particularly to such holders that are mountable on a photographic camera back and cooperate with a compatible film assemblage to facilitate daylight-handling of one or more photosensitive film sheets in the assemblage.

BACKGROUND OF THE INVENTION

Presently, high pull forces can be experienced when using a film packet as described in U.S. Pat. Nos. 4,994,836 and 4,994,835, incorporated herein by reference. These assemblies include a light-shielding envelope used to cover a film carrier sheet. The light-shielding envelope is formed from stiff paper on which a coating has been applied. The envelope is folded to form a jacket with one open end. The film carrier sheet is placed within the open end. In the manufacture of the envelope, it is necessary to provide a surface that can be sealed while providing low friction control. Currently high friction is exhibited when a light-shielding envelope is withdrawn over the film carrier sheet.

The present invention provides a light shielding envelope, which is heat sealable while providing low and controlled friction allowing easy removal of the film carrier sheet.

SUMMARY OF THE INVENTION

The present invention is a film packet which includes a photosensitive film sheet having leading and trailing ends, an elongate carrier sheet having first and second outward-facing surfaces, the carrier sheet including the leading and trailing end sections and an intermediate section between the end sections. The film sheet is detachably attached to the first outward-facing surface of the intermediate section with the leading and trailing ends thereof and is oriented toward the leading and trailing end sections respectively. The leading end section extends longitudinally beyond the intermediate section and terminates in a tab. The trailing end section extends longitudinally beyond the intermediate section and has a transversely disposed light-locking element secured thereto. A light-shielding envelope removably encloses the carrier sheet and the film sheet. The envelope has first and second exterior surfaces overlying the first and second outward-facing surfaces respectively and has first and second interior surfaces facing the first and second outward surfaces respectively. The envelope includes longitudinally extending leading and trailing end portions overlying the leading and trailing end sections respectively. The leading end portion is sealed closed, and the trailing end portion is closable by cooperative engagement with the light-locking element. The leading end portion includes first and second graspable zones. The first graspable zone overlies the tab so that, when grasped, the first zone is pressed against the tab and the second graspable zone does not overlie the tab so that, when grasped, the second zone is not pressed thereagainst. The trailing end portion has a transversely disposed movement-limiting element secured to said first exterior surface thereof wherein the envelope is removable from the carrier sheet and film sheet by longitudinal relative movement therebetween in a direction separating the trailing end portion from the light-locking element. The first and second interior surfaces of the envelope have a coating thereon comprising a first polymer and a second polymer at a first polymer to second polymer weight ratio of from 1:1 to 10:1.

BRIEF DESCRIPTION OF THE DRAWINGS

In the detailed description of the preferred embodiment of this invention presented below, reference is made to the accompanying drawings, wherein like reference numerals denote like elements, and wherein:

FIG. 1 is a top-plan view of a photographic film assemblage, or film packet, of a type usable in cooperation with the improved film holder of this invention, showing the packet in its fully assembled and closed condition;

FIG. 2 is a top-plan view of the film packet depicted in FIG. 1, showing a light-shielding envelope thereof as withdrawn from a photosensitive film sheet therein;

FIG. 3 is an enlarged top-plan view of the film packet of FIG. 1 in its fully assembled and closed condition, showing (via broken lines) the photosensitive film sheet and a carrier sheet therefor as hidden within the light-shielding envelope;

FIG. 4 is an elevational view of the film packet of FIG. 3;

DETAILED DESCRIPTION OF THE INVENTION

Because certain parts of photographic film assemblages and holders are well known, the following description is directed in particular to those elements forming, cooperating directly with, or relating to, this invention. Elements not specifically shown or described herein are selectable from those known in the relevant art.

Figure 5:
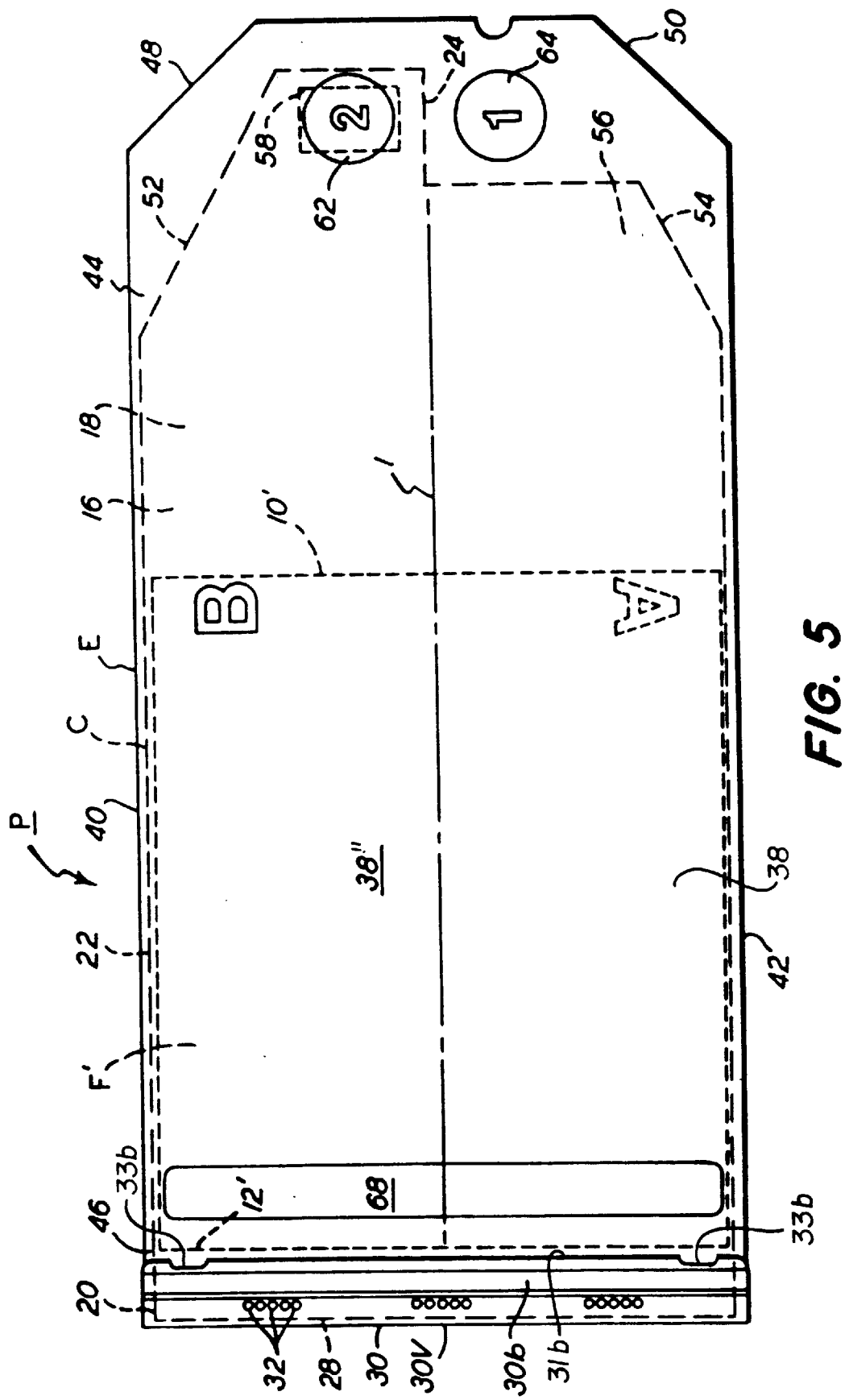
FIG. 5 is an enlarged bottom-plan view similar to FIG. 3 but showing (via broken lines) a second photosensitive film sheet on the other side of the carrier sheet.
Figure 6:
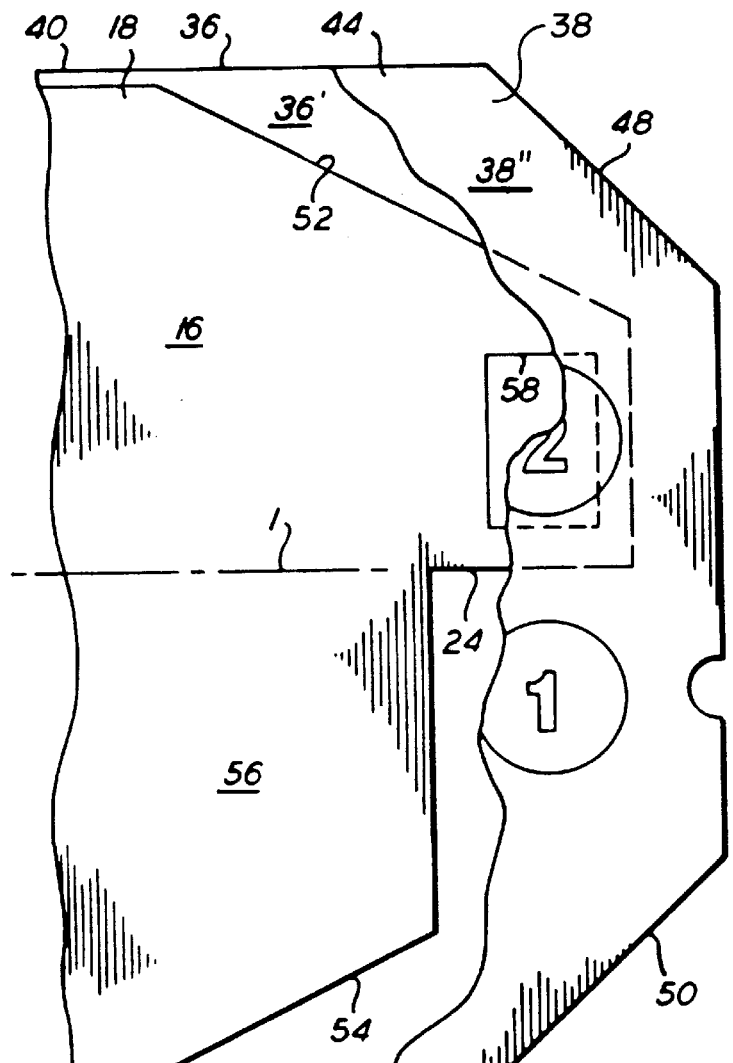
FIG. 6 is an enlarged partial view of the film packet as depicted in FIG. 5, with the light-shielding envelope broken away to reveal a leading end section of the carrier sheet therewithin.
Figure 7:
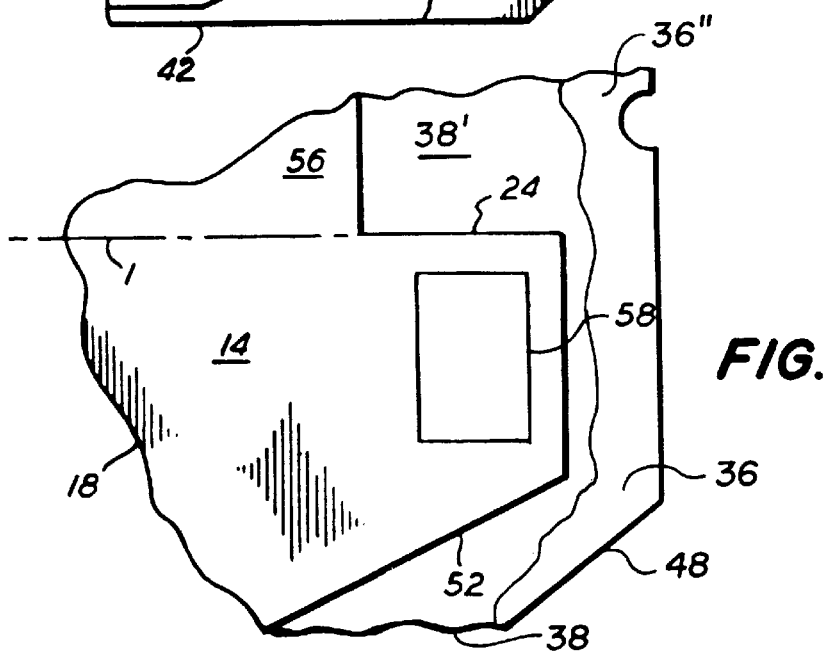
FIG. 7 is an enlarged partial top-plan view of the leading end section of the carrier sheet, showing details of a tab portion thereof.

FIGS. 1–7 illustrate a photographic film assemblage, or film packet, of a type usable in cooperation with the improved film holder as described in U.S. Pat. Nos. 4,994,835 and 4,994,836. FIGS. 1, 3, and 5 present plan views of such a packet, designated generally therein by the letter P, as it appears when in its fully assembled and closed condition.

FIG. 1 shows only the exteriorly visible components of packet P, as viewed from a first side thereof, including a light-shielding envelope E made of cardboard or other opaque material. As illustrated in FIG. 2, envelope E removably encloses a photosensitive film sheet F having leading and trailing ends 10 and 12, respectively, and an elongate carrier sheet C, to which film sheet F is detachably attached for facilitating use of the film sheet.

FIGS. 3 and 5 present, respectively, top-plan and bottom-plan views of packet P, FIG. 3 showing the first side thereof seen in FIG. 1, FIG. 5 showing the opposite, or second, side. It will thus be seen in FIGS. 3 and 5 that carrier sheet C (shown in broken lies) has first and second outward-facing surfaces 14 and 16 respectively. The carrier sheet includes leading and trailing end sections 18 and 20, respectively, and an intermediate section 22 between the two end sections. As seen in FIG. 3, film sheet F is detachably attached to the first outward-facing surface 14 of intermediate section 22, with its leading and trailing ends 10 and 12 respectively oriented toward the leading and trailing end sections 18 and 20. Similarly, as seen in FIG. 5, a second photosensitive film sheet F' is detachably attached to the second outward-facing surface 16 of intermediate section 22, with its leading and trailing ends 10' and 12' respectively oriented toward leading and trailing end sections 18 and 20.

Leading end section 18 extending longitudinally beyond intermediate section 22 (to the right, as viewed in FIGS. 3 and 5) and terminates in a tab 24 projecting therefrom as shown. Trailing end section 20 extends longitudinally beyond intermediate section 22 (to the left, as viewed in FIGS. 3 and 5) and includes a transverse edge 28, along which is secured a transversely disposed lightlocking element 30. Element 30 may be secured to end section 20 by crimping it thereto, as illustrated by the three series of dimples 32 extending parallel with, and adjacent to, edge 28.

As shown in FIG. 4 (which presents an end view of element 30), the light-locking element is generally V-shaped in cross section, having a vertex 30v with diverging first and second flange portions 30a and 30b extending angularly therefrom over the first and second outward-facing surfaces 14 and 16, respectively, of end section 20 and terminating in outward-projecting edges 31a and 31b. As shown in FIGS. 3 and 5, edges 31a and 31b have spaced-apart pairs of cutouts 33a and 33b, respectively, located near the lateral ends of element 30. When secured to end section 20 as shown, element 30 provides first and second recesses 34a and 34b disposed, respectively, between flange portions 30a and 30b and the outward-facing surfaces 14 and 16 of end section 20.

Light-shielding envelope E comprises first and second opposing walls 36 and 38, respectively, which are joined along their lateral edges 40 and 42 to provide a sleeve-like enclosure for receiving the carrier sheet and attached film sheets. The opposing interior surfaces of walls 36 and 38 comprise first and second inward-facing surfaces 36' and 38' (see FIGS. 6 and 7) that respectively overlie the first and second outward-facing surfaces 154 and 16 of carrier sheet C when received therebetween. In like manner, the corresponding exterior surfaces of walls 36 and 38 comprise first and second outward-facing surfaces 36" and 38" (see FIGS. 1–7) that respectively overlie the carrier sheet surfaces 14 and 16.

The envelope further includes longitudinally extending leading and trailing end portions 44 and 46 that respectively overlie the leading and trailing end sections 18 and 20 of the carrier sheet. Leading end portion 44 is sealed closed along its outer edges, and its corners are beveled as shown at 48 and 50. Trailing end portion 46 by itself is left open to permit insertion and withdrawal of the carrier sheet and film sheets therethrough; but when those sheets are fully inserted as shown in FIGS. 1 and 3–5, end portion 46 is closed by entry thereof into recesses 34a and 34b and compressive engagement with flange portions 30a and 30b of light-locking element 30.

The formulation of the present invention is coated on the inward facing surfaces 36' and 38' of envelope E. The lateral edges are folded over to provide a sleeve like enclosure for receiving the carrier sheet and attached film sheets. The heat from the coating allows lateral edges 40 and 42 to be sealed and the enclosure to be formed.

To facilitate insertion of the carrier and film sheets through end portion 46 and fully into the envelope, the carrier sheet leading end section is beveled as shown at 52 and 54, and the two film sheets F and F' are detachably attached to the carrier sheet at their leading ends 10 and 10'. Also, to facilitate detaching the film sheets from the carrier sheet after withdrawal from the envelope, each film sheet is detachably attached only at its leading end, so that its trailing end and image area can be easily lifted from the carrier sheet and its leading end then peeled off.

It will be seen in FIGS. 3 and 5–7 that the tab 24 on carrier sheet leading end section 18 is eccentrically disposed, relative to the carrier sheet longitudinal center line 1, and that it extends farther from intermediate section 22 than does any other portion of leading end section 18. That is to say, the leading end section 18 extends asymmetrically relative to center line 1 such that it has a longer portion, including tab 24, disposed at one side of the center line and a shorter portion 56, not including tab 24, at the other side of said line.

As illustrated in FIGS. 3 and 5–7, tab 24 includes a rectangular aperture 58 cut through it. Although shown as rectangular, aperture 58 could as well take some other shape.

Referring now to FIG. 3 and 5, the envelope leading end portion 44 comprises first and second graspable zones 62 and 64, respectively, which are transversely aligned with each other. It will be seen that the first graspable zone 62 overlies tab aperture 58, so that, when grasped, the opposing envelope walls in zone 62 are squeezed together through aperture 58, thereby helping to prevent unintended relative movement between the envelope and the carrier sheet. It will also be noted that the second graspable zone 64 does not overlie tab 24 at all. Instead, it overlies a region inside the envelope that is transversely spaced from the tab and longitudinally spaced from the leading end section shorter portion 56, i.e., it overlies no part of the leading end section. Consequently, when grasped, the opposing envelope walls in zone 64 are squeezed together, entirely apart form the leading end section, so that relative movement between the envelope and the carrier sheet is not prevented.

As shown in FIGS. 1–5, the envelope first and second walls 36 and 38 have a pair of movement-limiting elements, or stop strips, 66 and 68 transversely disposed on their outward-facing exterior surfaces 36" and 38", respectively, near the envelope trailing end portion 46. Strips 66 and 68 may be made of cardboard or plastic and adhered or sealed to their respective envelope wall surfaces. Their thickness or height above those surfaces must be sufficient to be readily engageable by one or more cooperating members in a compatible film packet holder as in U.S. Pat. Nos. 4,994,835 and 4,994,836.

The present invention provides coating that improves the seal strength and friction characteristics of the film packet. The coating is applied to the interior surface of the first and second inward facing surfaces 36' and 38' of walls 36 and 38 of light shielding envelope E. The coating includes a first polymer capable of acting as a lubricant and a second polymer capable of acting as a binder for the first polymer and which can be crosslinked or hardened.

The first polymer is a lubricant that includes dispersions of submicron size, from 0.01 $\mu$m to 0.5 $\mu$m wax particles such as those offered commercially as aqueous or non-aqueous dispersions of polyolefins, polypropylene, polyethylene, high density polyethylene, oxidized polyethylene, ethylene acrylic acid copolymers, microcrystalline wax, paraffin, and natural waxes such as carnauba wax, and aqueous dispersions of synthetic waxes from such companies as, but not limited to, Chemical Corporation of America (Chemcor), Inc., Michelman Inc., Shamrock Technologies Inc., Daniel Products Company, and non aqueous dispersions from Daniel Products. The dispersion may also contain dispersing aids such as polyethylene glycol, coating aids, viscosity modifiers, and surfactants. Mixtures of these lubricants or polymers can be used.

The second polymer can be aqueous soluble polymers such as gelatin, analogs of gelatin, nylons, hydroxy ethyl cellulose, hydroxy propyl cellulose, carboxy methyl cellulose, polyvinyl alcohol, poly(vinyl pyrrolidone), polyacrylamide, or solvent soluble polymers such as cellulose esters such as cellulose diacetates and triacetates, cellulose acetate propionate, cellulose acetate butyrate, cellulose nitrate, polyacrylates such as polymethyl methacrylate, polyphenylmethacrylate and copolymers with acrylic or methacrylic acid, or sulfonates, polyesters, polyurethanes, urea resins, melamine resins, urea-formaldehyde resins, polyacetals, polybutyrals, polyvinyl alcohol, epoxies and epoxy acrylates, phenoxy resins, polycarbonates, vinyl chloride-vinyl acetate copolymers, vinyl chloride-vinyl acetate-vinyl-alcohol copolymers, vinyl chloride-vinyl acetate-maleic acid polymers, vinyl chloride-vinylidene chloride copolymers, vinyl chloride-acrylonitrile copolymers, acrylic ester-acrylonitrile copolymers, acrylic ester-vinylidene chloride copolymers, methacrylic ester-styrene copolymers, butadiene-acrylonitrile copolymers, acrylonitrile-butadiene-acrylic or methacrylic acid copolymers, styrene-butadiene copolymers, resorcinol and phenolic resins.

In addition, crosslinking agents or hardeners can be included in the coating. The crosslinkers or hardeners, such as bis(vinyl sulfone)s, [bis(vinylsulfonyl) (BVSM), BVSME, 1,2-bis(vinylsulfonylacetoamide)ethane, 2-haloethylsulfonyl], triazines and substituted triazenes, carbamoyloxy pyridinium, heterocyclic epoxides, bis(beta-acyloxyethyl)ketones, bis-chloroethylurea, bis-maleimides, aziradines, formamidinium, piperazine, divinyl benzene, 1,4-butyleneglycol methacrylate, trimethylpropane triacrylate, ethyleneglycol dimethacrylate combinations of these, or others known in the art, can be added which will crosslink the organic polymer and enable chemical bonds to be formed across the seal. Other crosslinking agents are organic isocyanates such as tetramethylene diisocyanate, hexamethylene diisocyanate, diisocyanato dimethylcyclohexane, dicyclohexylmethane diisocyanate, isophorone diisocyanate, dimethylbenzene diisocyanate, methylcyclohexylene diisocyanate, lysine diisocyanate, tolylene diisocyanate, diphenylmethane diisocyanate, aziridines such as taught in U.S. Pat. No. 4,225,665; ethyleneimines such as Xama-7 sold by EIT Industries; blocked isocyanates such as CA BI-12 sold by Cytec Industries; melamines such as methoxymethylmelamine as taught in U.S. Pat. No. 5,198,499; alkoxysilane coupling agents including those with epoxy, amine, hydroxyl, isocyanate, or vinyl functionality; Cymel type agents like Cymel 300, Cymel 303, Cymel 1170, Cymel 1171 sold by Cytec Industries; and bis-epoxides such as Epons sold by Shell may be used to crosslink the binder. Polyisocyanates prepared by reacting an excess of organic diisocyanate with an active hydrogen containing compound such as polyols, polyethers and polyesters including ethylene glycol, propylene glycol, dipropylene glycol, butylene glycol, trimethylol propane, hexanetriol, glycerine, sorbitol, pentaerythritol, caster oil, ethylenediamine, hexamethylenediamine, ethanolamine, diethanolamine, triethanolamine, water, ammonia, urea and the like, can also be used. Preferred crosslinking agents are bis(vinyl sulfone)s, such as bis(vinylsulfonyl) (BVSM), BVSME, 1,2-bis(vinylsulfonylacetoamide)ethane, 2-haloethylsulfonyl.

Coatings of this type provide heat-sealing capability when compounded as shown in the examples and provide low and controlled friction.

EXAMPLES

The coating solutions were prepared by dissolving gelatin (Gel, APO grade) in water at about 45° C. to make a 2–3 wt % final concentration (note, an alternate polymer performing the function of gelatin such as polyvinyl alcohol or other polymers would be used). The appropriate amount of the polyethylene (PE) aqueous emulsion was added, followed by the addition of coating aids, Alkonox XC (at 0.8 wt % of the total solids) and FT248 (at 0.4 wt % of the total solids).

Just prior to coating, the crosslinking agent BVSM was added (at 2 wt % of the gelatin) to the coating solution. The dry amounts of each component are shown in Table 1.

The solutions were coated on the outside surface of 8 mil thick paper (four layers, 2 mil each, bonded while wet) at a temperature of 32° C., using a calibrated coating rod that would give the appropriate dry lay down. The temperature of the coating block was immediately lowered to 13° C. and the coatings were allowed to chill set for up to 5 minutes. The samples were air dried at ambient temperature for 48 hrs prior to evaluation. The examples are presented in Table 1.

TABLE 1

| Examples | PE type | PE $g/m^2$ | Gel* $g/m^2$ | Ratio PE/Gel* | Total dry laydown $g/m^2$ | Kinetic Friction | Heat Seal Strength |
|---|---|---|---|---|---|---|---|
| 1 | PE325N35 | 1.61 | 1.61 | 1/1 | 3.22 | 0.11 | Fails in paper |
| 2 | PE325N35 | 3.23 | 3.23 | 1/1 | 6.46 | 0.12 | Fails in paper |
| 3 | PE325N35 | 5.17 | 1.29 | 4/1 | 6.46 | 0.09 | Fails in paper |
| 4 | ME02925 | 1.61 | 1.61 | 1/1 | 3.22 | 0.13 | Fails in paper |
| 5 | ME02925 | 6.46 | none | — | 6.46 | 0.33 | No seal |
| 6 | ME02925 | 5.17 | 1.29 | 4/1 | 6.46 | 0.16 | Fails in paper |
| 7 | ME72040 | 1.61 | 1.61 | 1/1 | 3.22 | 0.10 | Fails in paper |
| 8 | ME72040 | 3.23 | 3.23 | 1/1 | 6.46 | 0.12 | Fails in paper |
| 9 | ME72040 | 6.46 | none | — | 6.46 | 0.22 | No seal |

*Gel = Gelatin

PE325N35 is an emulsion of high-density polyethylene, purchased from Chemical Corporation of America.

ME02925 is an emulsion of low-density polyethylene purchased from Michelman, Inc.

ME72040 is an emulsion of an Epolene polyolefin wax purchased from Michelman, Inc. All these polyethylene emulsions were dialyzed for 24 hrs in a water bath prior to using.

Friction measurements were made using a pin-on-disk friction apparatus (see U.S. Pat. No. 5,234,889) using a non-rotating glass ball on the samples. The values of the kinetic friction coefficients are +/−0.01.

Heat seal strengths were determined by either pulling samples manually or with an Instron. The results are stated as "fails in paper" as the paper is weaker than the strength of the heat seal.

The data in Table 1 show that the presence of both PE and gelatin is required for low friction and for a heat seal to form. Typically, PE/Gel ratios of: 1/1 to 10/1, preferably 1/1 to 4/1 with total lay downs of 3.22 $g/m^2$ to 6.46 $g/m^2$ results in acceptable seals with low and controlled friction. Desired coefficient of friction for the application is less than 0.3 and preferably less than 0.2. The total lay down of the coating necessary for the invention will of course depend on the porosity and texture of the paper stock onto which the layer is coated. Examples 5 and 9 are comparative and show that without gelatin a seal cannot be formed. Further when gelatin is used in the coating without polyethylene an acceptable seal is formed but the coefficient of friction is too high (0.56 to 0.63 at 80% relative humidity and increases 1.0 at 100% relative humidity).

The invention has been described in detail with particular reference to certain preferred embodiments thereof, but it will be understood that variations and modifications can be effected within the spirit and scope of the invention.

What is claimed is:

1. A film packet comprising:

a photosensitive film sheet having leading and trailing ends;

an elongate carrier sheet having first and second outward-facing surfaces, said carrier sheet including leading and trailing end sections and an intermediate section between said end sections, said film sheet being detachably attached to said first outward-facing surface of said intermediate section with said leading and trailing ends thereof oriented toward said leading and trailing end sections respectively, said leading end section extending longitudinally beyond said intermediate section and terminating in a tab, said trailing end section extending longitudinally beyond said intermediate section and having a transversely disposed light-locking element secured thereto; and a light-shielding envelope removably enclosing said carrier sheet and said film sheet, said envelope having first and second exterior surfaces overlying said first and second outward-facing surfaces respectively and having first and second interior surfaces facing said first and second outward surfaces respectively, said envelope including longitudinally extending leading and trailing end portions overlying said leading and trailing end sections respectively, said leading end portion being sealed closed, said trailing end portion being closable by cooperative engagement with said light-locking element, said leading end portion including first and second graspable zones, said first graspable zone overlying said tab so that, when grasped, said first zone is pressed against said tab, said second graspable zone not overlying said tab so that, when grasped, said second zone is not pressed thereagainst, said trailing end portion having a transversely disposed movement-limiting element secured to said first exterior surface thereof, said envelope being removable from said carrier sheet and film sheet by longitudinal relative movement therebetween in a direction separating said trailing end portion from said light-locking element wherein said first and second interior surfaces having a coating thereon comprising a first polymer and a second polymer at a first polymer to second polymer weight ratio of from 1:1 to 10:1.

2. The film packet of claim 1 wherein the coating has a laydown of from 3.22 g/m² to 6.46 g/m².

3. The film packet of claim 1 wherein the coating further comprises crosslinking agents.

4. The film packet of claim 1 wherein the second polymer is selected from the group consisting of gelatin, nylons, hydroxy ethyl cellulose, hydroxy propyl cellulose, carboxy methyl cellulose, polyvinyl alcohol, poly(vinyl pyrrolidone), polyacrylamide, cellulose esters, polyacrylates, sulfonates, polyesters, polyurethanes, urea resins, melamine resins, urea-formaldehyde resins, polyacetals, polybutyrals, epoxies, epoxy acrylates, phenoxy resins, polycarbonates, vinyl chloride-vinyl acetate copolymers, vinyl chloride-vinyl acetate-vinyl-alcohol copolymers, vinyl chloride-vinyl acetate-maleic acid polymers, vinyl chloride-vinylidene chloride copolymers, vinyl chloride-acrylonitrile copolymers, acrylic ester-acrylonitrile copolymers, acrylic ester-vinylidene chloride copolymers, methacrylic ester-styrene copolymers, butadiene-acrylonitrile copolymers, acrylonitrile-butadiene-acrylic copolymers, acrylonitrile-butadiene-methacrylic acid copolymers, styrene-butadiene copolymers, resorcinol and phenolic resins.

5. The film packet of claim 1 wherein the first polymer is selected from the group consisting of polyolefins, polypropylene, polyethylene, high density polyethylene, oxidized polyethylene, ethylene acrylic acid copolymers, microcrystalline wax, paraffin, natural waxes, and synthetic waxes.

6. The film packet of claim 1 wherein the coating further comprises dispersing aids, coating aids, viscosity modifiers, or surfactants.

7. The film packet of claim 1 wherein the first polymer to second polymer weight ratio is from 1:1 to 4:1.

* * * * *